United States Patent
Lemke et al.

(12) 
(10) Patent No.: US 6,457,134 B1
(45) Date of Patent: Sep. 24, 2002

(54) PORTABLE COMPUTER WITH DIFFERENTIATED TIME-OUT FEATURE

(75) Inventors: Steven C. Lemke; Scott R. Johnson, both of Sunnyvale; Eric M. Lunsford, San Carlos; Nicholas Twyman, San Francisco; Ronald Marianetti, II, Morgan Hill; Neal A. Osborn, Milpitas, all of CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/296,017

(22) Filed: Apr. 21, 1999

(51) Int. Cl.$^7$ ................................ G06F 1/32
(52) U.S. Cl. ...................... 713/323; 713/324
(58) Field of Search ................ 713/300–340, 713/600–601

(56) References Cited

U.S. PATENT DOCUMENTS

| | | | |
|---|---|---|---|
| 3,744,034 A | 7/1973 | Paul | 340/172.5 |
| 4,860,372 A | 8/1989 | Kuzunuki et al. | 382/13 |
| 4,972,496 A | 11/1990 | Sklarew | 382/13 |
| 5,231,381 A | 7/1993 | Duwaer | 340/712 |
| 5,305,394 A | 4/1994 | Tanaka | 382/13 |
| 5,389,745 A | 2/1995 | Sakamoto | 178/18 |
| 5,434,929 A | 7/1995 | Beernink et al. | 382/187 |
| 5,444,192 A | 8/1995 | Shetye et al. | 178/18 |
| 5,452,371 A | 9/1995 | Bozinovic et al. | 382/187 |
| 5,528,743 A | 6/1996 | Tou et al. | 395/148 |
| 5,534,892 A | 7/1996 | Tagawa | 345/173 |
| 5,615,284 A | 3/1997 | Rhyne et al. | 382/187 |
| 5,621,817 A | 4/1997 | Bozinovic et al. | 382/189 |
| 5,630,148 A | 5/1997 | Norris | 395/750 |
| 5,664,205 A * | 9/1997 | O'Brien et al. | 713/322 |

(List continued on next page.)

FOREIGN PATENT DOCUMENTS

| | | | |
|---|---|---|---|
| GB | 2 235 797 A | 3/1991 | G06F/1/32 |
| WO | WO 96/27827 | 12/1996 | G06F/1/30 |

OTHER PUBLICATIONS

Gray, R. et al., "Efficient MC68HC08 programming: reducing cycle count and improving code density", *Dr. Dobb's Journal*, vol. 20, No. 5, May 1995, pp. 70–75.

Ruley, J. et al., "Handheld–to–Handheld Combat", *Windows Magazine*, No. 811, p. 55, Nov. 1997.

Dayton, D., "FRx extends reporting power of Platinum Series", *PC Week*, vol. 8, No. 5, p. 29(2), Feb. 1991.

Forbes, J. et al., "Palm PCs get a Big Hand (What's Hot)", *Windows Magazine*, No. 905, p. 96, May 1998.

Penwarden, M., "More Muscle for HP's OmniBook", *Windows Magazine*, No. 501, p. 110, Jan. 1994.

Feigel, C., "Motorola preview embedded PowerPCs; 403 and 505 processors combine strong performance with low cost", *Microprocessor Report*, vol. 8, No. 6, pp. 1–5, May 1994.

Bursky, D., "Evolving DSP chips do more", *Electronic Design*, vol. 38, No. 23, pp. 51–59, Dec. 1990.

*Primary Examiner*—Sumati Lefkowitz
(74) *Attorney, Agent, or Firm*—Van Mahamedi; Hickman Palermo Truong & Becker LLP

(57) ABSTRACT

Embodiments of the invention provide for operating a handheld computer with multiple time-out periods in a manner that is more efficient and effective for conserving power than previous systems. In an embodiment, the handheld computer implements one or more additional time-out periods by identifying an occurrence of an event that requires the handheld computer to be in the high power state to perform a specific function. An event may include a function such as sounding an alarm, although other events are also encompassed by embodiments of this invention. When an event is identified, the power state of the handheld computer prior to identifying the event is recalled. The handheld computer then implements a time-out period based on its previous power state. In one embodiment, if the handheld computer was in a low-power state prior to the event occurring, the time-out period is shortened.

52 Claims, 4 Drawing Sheets

U.S. PATENT DOCUMENTS

| | | | | |
|---|---|---|---|---|
| 5,666,539 A | | 9/1997 | Kenkel | 395/750.03 |
| 5,698,822 A | | 12/1997 | Haneda et al. | 178/18 |
| 5,752,044 A | * | 5/1998 | Crump et al. | 713/323 |
| 5,841,901 A | | 11/1998 | Arai et al. | 382/187 |
| 5,905,901 A | * | 5/1999 | Klein | 713/324 |
| 5,920,727 A | * | 7/1999 | Kikinis et al. | 713/323 |
| 5,926,404 A | * | 7/1999 | Zeller et al. | 713/321 |
| 6,128,745 A | * | 10/2000 | Anderson et al. | 713/323 |
| 6,223,294 B1 | * | 4/2001 | Kondoh | 713/310 |

* cited by examiner

PORTABLE COMPUTER WITH DIFFERENTIATED TIME-OUT FEATURE

BACKGROUND OF THE INVENTION

1. Field of the Invention

This invention pertains to a portable computing device. More specifically, embodiments of this invention encompass a portable computer that implements a differentiated time period after which the computer reduces power consumption.

2. Description of the Related Art

Power management is applied to reduce power consumption of computer devices such as desktops, laptops, and portable computers. In particular, portable computer devices require conservation of battery life. Power managed implementation in such devices generally provide for the computer device to change into a state or mode of low power consumption after a period of inactivity. The period of inactivity is known in the art as a "time-out" period. For portable computers such as laptops, a time-out may cause the device to switch to off or into a sleep-mode where power consumption is minimized. Typically, a time-out occurs when the user does not actuate any input components, such as a touch sensitive screen or input buttons/keys.

Some computers provide for a single time-out value to be universally applied to its entire system. Other computers such as laptops and portable computers provide for constant time-out periods that are individually applied to a specific peripheral device. In such systems, one of the peripheral devices may enter a sleep-mode after a time-out period for that device passes, while other peripheral devices or the computer itself may take longer additional time before completing the timing-out. For example, many laptop computers have one time-out value for a disk drive (e.g., two minutes), and another time-out value for a display (e.g., four minutes). The disk drive often times-out a few minutes before the display.

Handheld computers, such as Zaurus™ personal digital assistants manufactured by the Sharp Corp. and the Palm III™ organizer manufactured by the 3Com Corp., utilize one universal time-out which can extend for several minutes. These previous systems utilize the same time-out period even when sounding a brief alarm from a sleep state, and then stay on for the full duration of the time-out even though user activity during that time-out period may not occur. As a result, the implementation of the time-out feature in previous systems is inefficient with respect to certain applications.

What is needed is an improved time-out system for portable computers and handheld computers.

SUMMARY OF THE INVENTION

Various embodiments of this invention provide for operating a portable computer with multiple time-out periods in a manner that is more efficient and effective for conserving power than previous systems. In an embodiment, the portable computer implements one or more additional time-out periods by identifying an occurrence of an event that requires the portable computer to be in the high power state to perform a specific function. An event may include a function such as sounding an alarm, although other events are also encompassed by embodiments of this invention. When an event is identified, the power state of the portable computer prior to identifying the event is recalled. The portable computer then implements a time-out period based on its previous power state.

Other embodiments of this invention provide for a portable computer that includes a processor associated with a memory, where the processor may be operated in either a high power state or a low power state. The processor may be used to identify an occurrence of an event, as described above. When an event is identified, depending on the state of the portable computer, the processor recalls the state of the portable computer from the memory, and then executes a program to implement one or more additional time-out periods. The processor then determines a duration of a time-out period based on the previous state of the portable computer.

DETAILED DESCRIPTION

Embodiments of this invention selectively alter an existing default time-out feature on a portable computer based on a previous power state of the portable computer. Specifically, the portable computer may identify an event in which a shortened time-out period may be implemented. Upon identifying such an event, the portable computer shortens the default time-out feature if it is in a low power state prior to an occurrence of the event. Examples of portable computers for use with embodiments of this invention include any one of the PalmPilot™, Palm III™, Palm Palm V™, and Palm VII™ organizers, manufactured by the 3Com Corporation. Other embodiments of the invention can include Windows CE™ portable computers, or other handheld computers and personal digital assistants.

In previous systems, the portable computer switches to a low power state only after user interaction has ceased for the duration of a predetermined time-out period. However, certain applications or events that trigger the portable computer from a low power state are intermittent and independent of user interaction. For example, portable computing devices in particular employ alarms to notify a user of an appointment or calendar item. The processor of the portable computer is active to sound and/or display the alarm. If the portable computer was not in active use at the time the alarm occurred, we have found that the user often does not use the portable computer immediately after the alarm. However, the predetermined time-out period of previous systems precludes the portable computer from entering a low power state until the time-out duration has passed. Therefore, application of a universal time-out duration that is selected based on task-oriented usage is inefficient in that the portable computer remains powered on for the full duration of the time-out period. What is needed is a much shorter time-out duration that is dependent on the function performed by the processor preceding the occurrence of the time-out.

Various embodiments of this invention provide for a differentiated time period in which a portable computer may switch into a state of lower power consumption based on knowledge of the previous power state of the portable computer. As will be further described, embodiments of this invention may employ a power state as a predictor of subsequent power states, as well as a predictor of future user activity. With such predictions based on knowledge of preceding power states, the portable computer can implement a new or alter an existing time-out duration in which the computer enters a state of low power consumption. This allows the portable computer to be optimized for user convenience and power management. An embodiment of this invention allows a user to complete periodic uses on the portable computer, but also enables the portable computer to switch into a lower power state during a shortened time-out period in which user activity is not expected.

Figure 1:
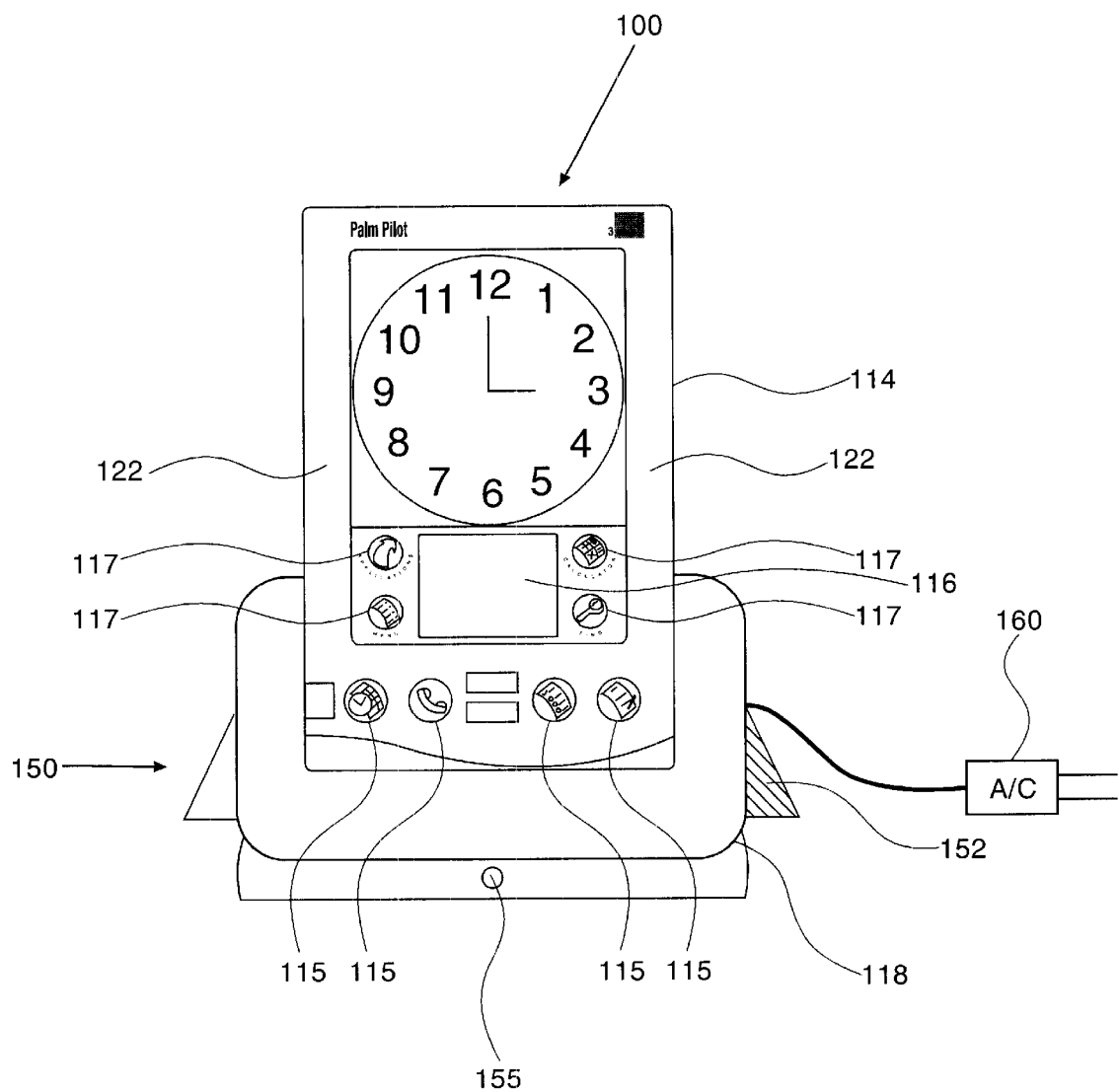
FIG. 1 is an illustration of a portable computing device including an embodiment of the invention.
Figure 2:
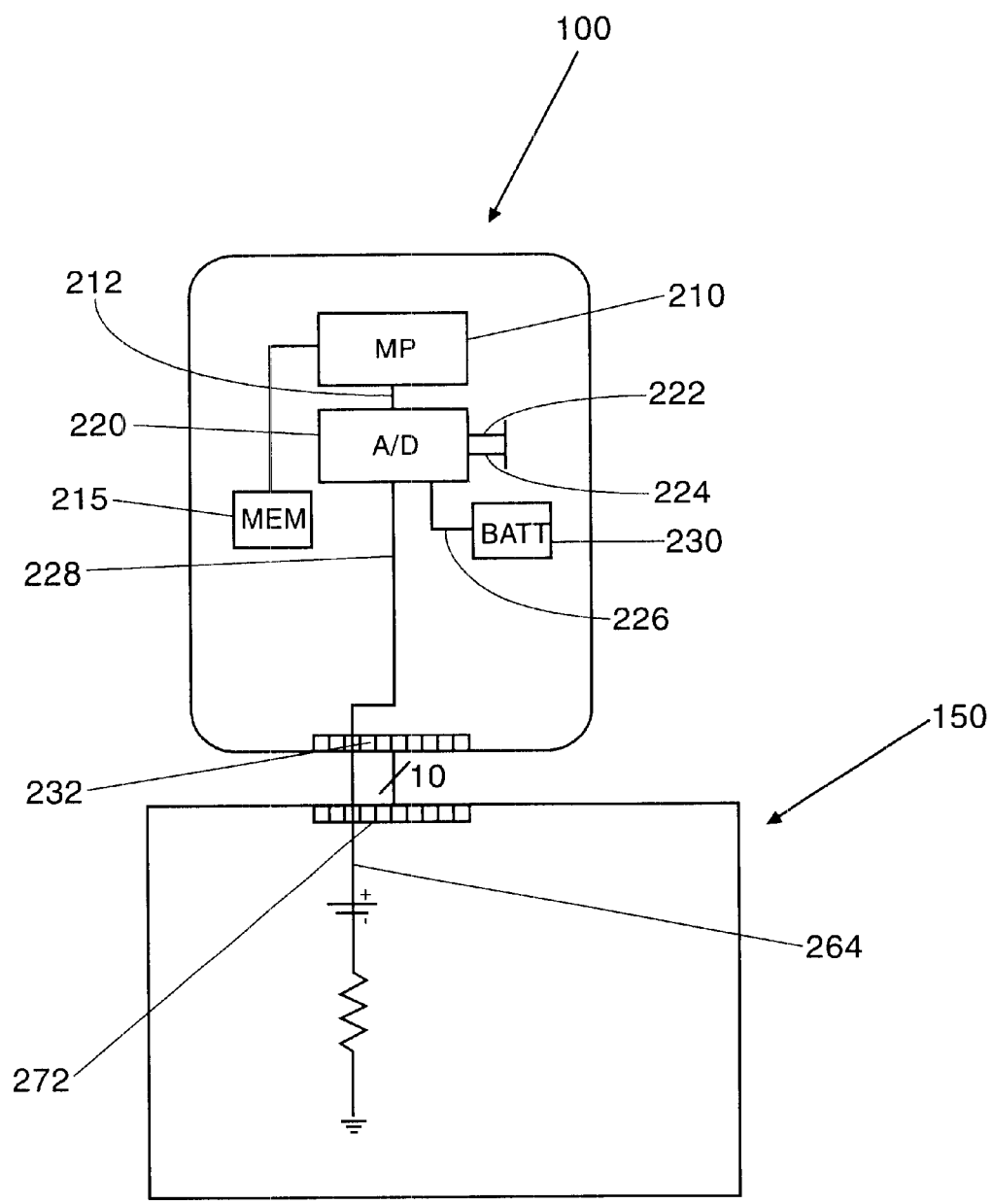
FIG. 2 is a schematic diagram of a portable computing device including an embodiment of the invention.
Figure 3:
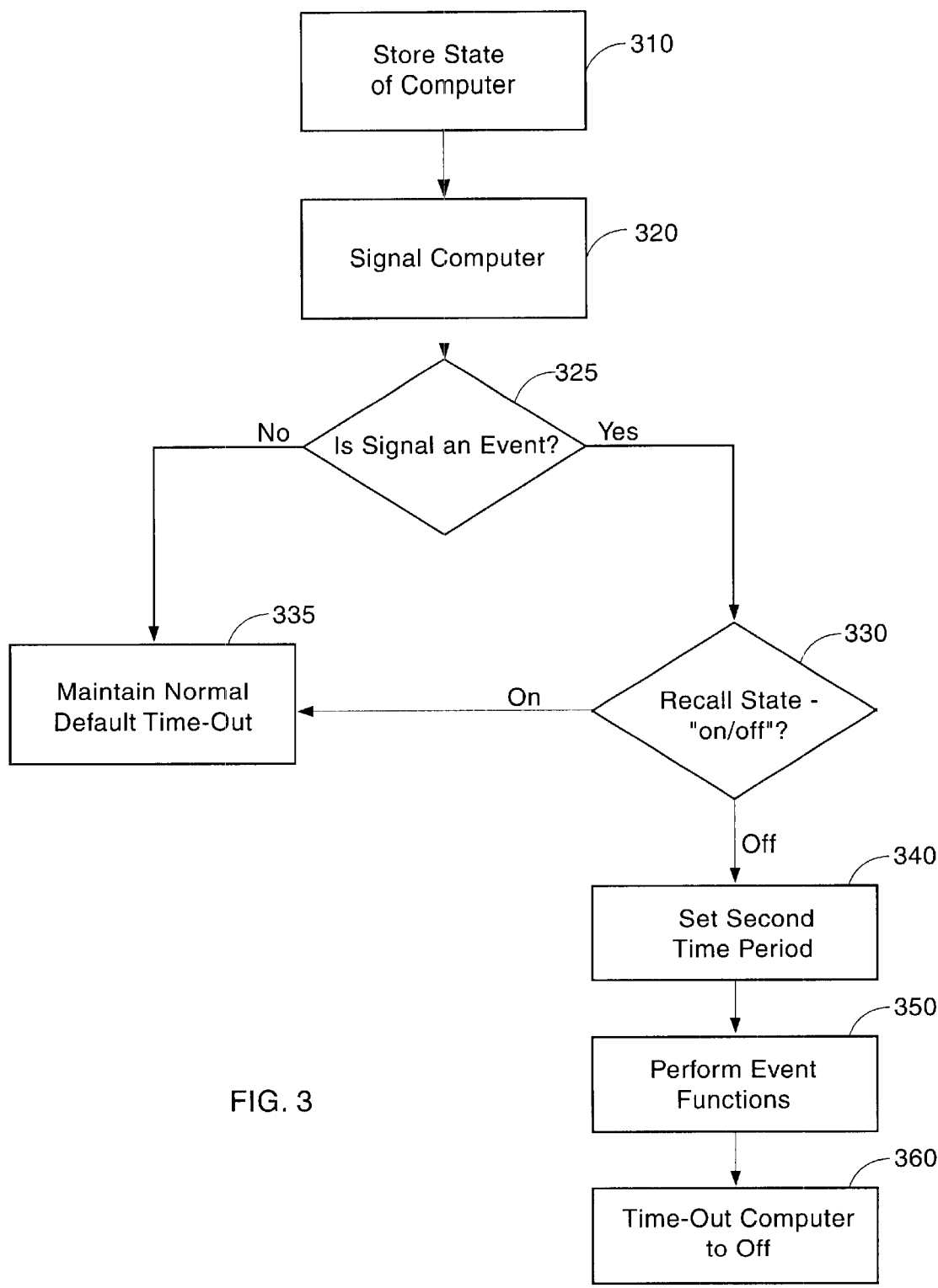
FIG. 3 is a flowchart of an algorithm for implementing a differentiated time-out value using the portable computing device of FIGS. 1 and 2.
Figure 4:
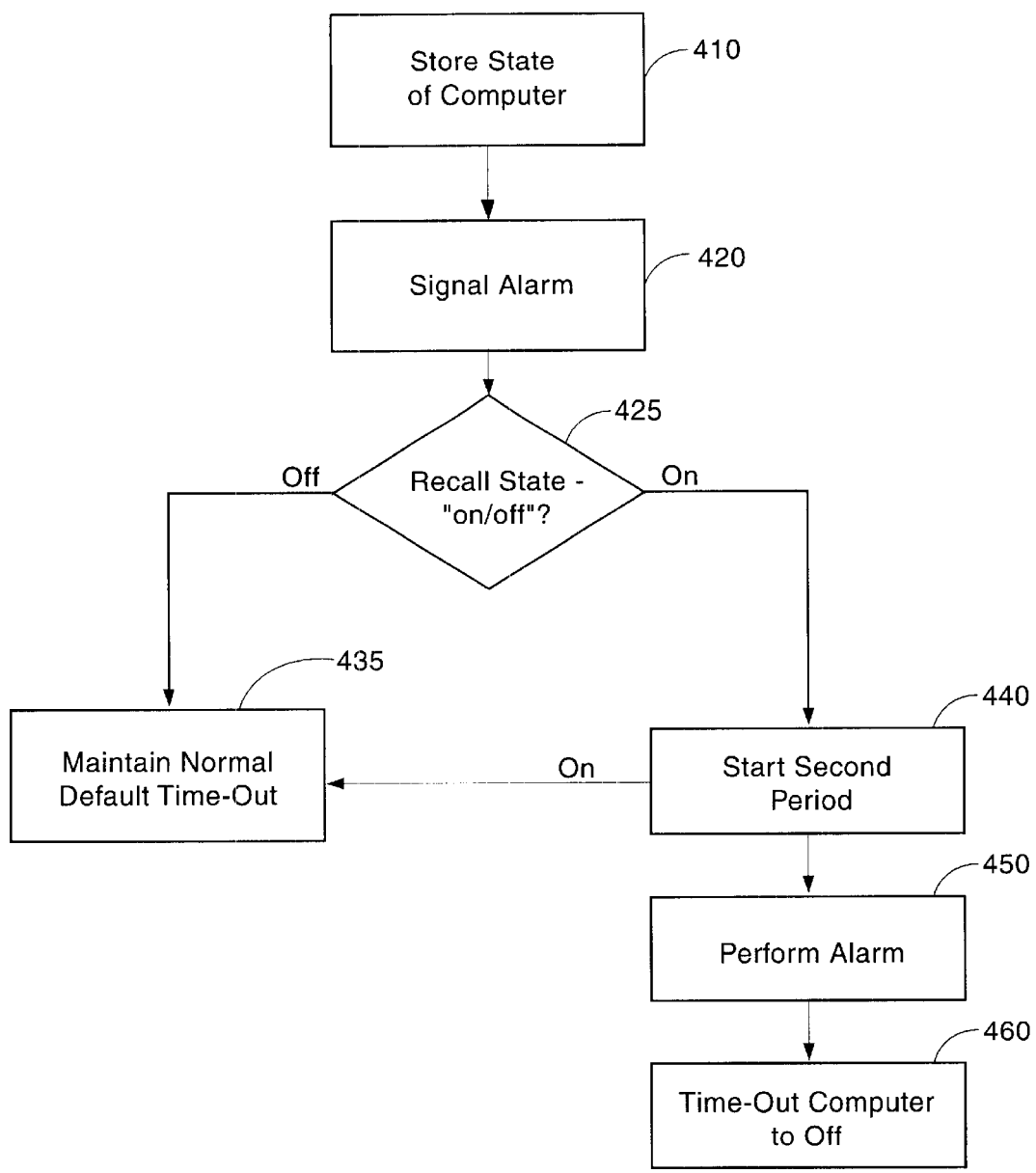
FIG. 4 is a flowchart of an algorithm for implementing a differentiated time-out value for an alarm function using the portable computing device of FIGS. 1 and 2.

Portions of this text corresponding to FIG. 1 and FIG. 2 disclose features and hardware of a portable computer suitable for use with embodiments of this invention. FIG. 3 describes an algorithm according to an embodiment of this invention. FIG. 4 discloses an example of an algorithm of this invention for an alarm function of a portable computer.

For purposes of this description, a portable computer is a combination of a processor coupled to a memory. A portable computer is a computer having a portable energy source. Handheld computers are portable computers designed to be carried with one hand.

Description of Portable Computer and Hardware Components Suitable for Use with Embodiments of the Invention The following describes a portable computer and various accessory devices, as shown by FIGS. 1 and 2. See the discussion of FIG. 3 below for description of how time-outs in such systems can be altered depending on the state of the portable computer.

FIG. 1 illustrates a portable computer 100 for use with embodiments of this invention. Preferably, the portable computer 100 includes interactive hardware and software for performing functions such as maintaining calendars and phone lists. The portable computer 100 shown in FIG. 1 includes a plurality of input functions keys 115 and a display 114 having a graphic user interface. The display 114 allows the user to select and alter displayed content using a pointer such as a stylus (not shown). In an embodiment, the display 114 also includes a Graffiti™ writing area 116 for tracing alphanumeric characters as input using the stylus. A plurality of digital function keys 117 for performing automated or pre-programmed functions for operating the software may be provided on a portion of the display 114. The particular example of FIG. 1 illustrates a PalmPilot™ organizer from 3Com Corporation.

As will be further described, the accessory device may include a communication cradle 150 having data transfer capabilities with the portable computer 100 and with a data network or another computer. Other embodiments for the accessory device may provide serial data transfer with other computers or data networks such as provided by a modem device or Universal Serial Bus (USB) cradle or device. By using such accessory devices, the portable computer 100 may link to a personal computer for the purpose of downloading or uploading software, or for synchronizing data on the portable computer 100 with the personal computer. FIG. 1 shows that the communication cradle 150 includes a stand 152. The communication cradle 150 may also include an A/C adapter 160 that extends power from an external socket to the portable computer 100. The A/C adapter 160 may be used to power the communication cradle 150 and the portable computer 100. The portable computer 100 couples to the communication cradle 150 through a connector in the stand 152. A button 155 may effectuate an electrical connection between the communication cradle 150 and the portable computer 100 when the two are coupled.

The portable computer 100 may include hardware and/or software to detect whether the communication cradle 150 is actively coupled to the portable computer 100. The software on the portable computer 100 may be altered and/or reconfigured to optimize functions of the portable computer 100 according to whether the communication cradle 150 is actively coupled. In instances where the communication cradle 150 provides A/C power, the portable computer 100 may launch programs that are practical only when extended power is available. FIG. 1 shows that the portable computer 100 may, for example, run a program to continuously display a world-clock on the display 114 when an accessory device such as the communication cradle 150 is detected. In this example, the type of accessory indicates that power is being supplied from an external power source so leaving the portable computer 100 on does not drain the battery.

In an embodiment of the invention, the portable computer 100 may alter or configure software to accommodate a particular accessory type. To this end, the portable computer 100 may include resources that detect the type of accessory that is actively coupled, and may further alter or reconfigure software to accommodate the specific accessory type without requiring user input. For example, under an embodiment of this invention, the portable computer 100 will automatically run a modem software application when a modem accessory device is actively coupled. But the portable computer 100 will not execute the modem application if the actively coupled accessory device is a USB cradle. In this manner, the portable computer 100 may implement software for a particular accessory type with minimal user attention, while precluding the possibility of running a program for the wrong accessory device. This is advantageous because erroneously running applications for the wrong accessory device, such as modems, can harm the portable computer 100 and/or the actual accessory connected to the portable computer 100.

FIG. 2 is a block diagram schematic of an embodiment for use with this invention. The portable computer 100 includes a processor 210, an analog-digital (A/D) converter 220, and a battery source 230. The portable computer 100 also includes a memory 215 coupled to the processor 210. A clock circuit may be integrated with the processor 210 to generate a clock signal. As with the previous embodiment, the processor 210 is preferably a Motorola EZ Dragonball™ 328 that is coupled to the A/D converter 220 using an 8-bit connection 212. The memory 215 includes one or more registers which may continually store values. As will be further discussed, one of the registers may be used to store the state of the portable computer 100. The A/D converter 220 preferably includes four channels. A first and second channel 222 and 224 of the A/D converter 220 are dedicated for display operations. A third channel 226 couples to the battery source 230.

In an embodiment, a fourth channel of the A/D converter 220 may be used as a signal line 205 to extend to a communication port 232 of the portable computer 100. The A/D converter 220 couples to the battery source 230 via the third channel 226 to receive a reference voltage for a comparator (not shown) incorporated within the A/D converter 220. The communication port 232 has a male pin connector electrically connecting with a corresponding connector element of the communication cradle 150.

The communication port 232 may be used to receive communications from other computers via a serial data interface or parallel communication port. In addition, the portable computer 100 may communicate with other computer devices, including printers, facsimile machines, desktop computers, other similar devices through an Infrared (IR) port. The portable computer 100 may also include an antenna, or other receiver (not shown) for receiving wireless communications such as pages.

In the specific example provided by FIG. 2, the communication cradle 150 includes an output node 264 providing a voltage source, and an output port 272 for mating with the portable computer 100. The output port 272 includes a mating pin connector for the communication port 232. The output port 272 provides a male pin connector with nine pins designated for functions such as parallel data transfer and parity. One of the pins may be used to couple the A/D converter 220 to the output node 264 of the communication cradle 150 for the purpose of detecting and distinguishing accessory devices from each other. The A/D converter 220 receives a reference voltage from the battery source 230, and an input signal from the signal line 205 extending through the available pin of the communication port 232.

The portable computer 100 and the accessory device may be coupled so that the pin electrically contacts a mating pin in the output port 272 of the accessory device 150. When the accessory device 150 is powered, it provides a voltage on the output node that is passed to the signal line 205. The voltage on the signal line 205 is then detected by the A/D converter 220. The comparator within the A/D converter 220 compares the voltage on the signal line 205 with the reference voltage supplied from the battery source 230 via the third channel 226. The A/D converter 220 can signal the memory 215 to match the voltage on the signal line 205 with a type of accessory. The memory 215 may be programmed to store a look-up that lists accessory types according to a voltage produced on a corresponding output node of each accessory type. The voltages on the signal line 205 may be distinguishable between accessory device. Distinguishing between accessory devices in this manner enables the portable computer 100 to select or alter programming to accommodate one device over another in a quick and cost efficient manner. For example, the portable computer 100 can immediately detect the presence of the USB cradle and alter software to accommodate data transfer using the USB cradle. This alteration to the software can be done even if the portable computer 100 is in a sleep-mode, so that the user has quicker access to the functions available from coupling the USB cradle. In another example, the portable computer 100 may be used to preclude inadvertent activation of a modem, because transmitting or altering programs for a modem that is not existent can be damaging to the system.

DESCRIPTION OF ALGORITHMS ACCORDING TO EMBODIMENTS OF THE INVENTION

FIG. 3 details an algorithm under an embodiment of the invention implemented with a portable computer. The algorithm may be performed by a processor and memory, such as shown by FIGS. 1 and 2. Numerals cited below that reference elements in FIGS. 1 and 2 are intended to be exemplary components for practicing this embodiment.

The algorithm may be employed in an embodiment where the portable computer 100 operates in at least two states which have distinct ranges of power consumption. For example, an embodiment of this invention provides the portable computer with a sleep-mode, a doze-mode, and an on-mode. The sleep-mode is the state in which the portable computer 100 consumes the least amount of power. In this state, a user cannot operate the portable computer 100 unless the user first switches the portable computer to another state, i.e. turns the portable computer "on" or switches the portable computer into a "wake" state from an accessory. While in the sleep-mode, the portable computer only performs a few functions, such as maintaining a clock and alarm functions.

In the doze-mode, additional hardware features of the portable computer are powered. The display 114 or the function keys 115 may be set to receive and transmit data to the processor 210. The portable computer 100 may also receive sufficient power to display content on the display 114. However, the processor 210 and/or other hardware items may not be fully enabled. The doze-mode is an operational mode for the user, but entering input or performing functions may be delayed until the portable computer enters a more fully powered state such as the on-mode.

In the on-mode, the portable computer is fully enabled. Sufficient power is provided to the processor to complete calculations, execute programs, display content, and receive input and display output with minimal delay. Therefore, a high power state as used in this disclosure may also refer to a doze-mode, where the low power state refers to a sleep-mode.

Previous portable computers provide for a default time-out period in which the portable computer switches from a high power state to a low power state to preserve battery resources. The time-out period is generally preprogrammed to time the portable computer 100 out after a duration in which no input is entered into the portable computer or in which no activity occurs that may otherwise require the portable computer to stay on. In an embodiment such as the portable computer 100 of FIG. 1, the portable computer 100 may provide for a two-minute default time-out period. The user may change the duration of the default time-out period, such as to one or three minutes. When the portable computer 100 is on, it may time-out and return to a low power state if there is no activity after the duration of the time-out period. In previous systems, the time-out period is constant regardless of the functions performed by the portable computer 100, or what state the portable computer was in prior to performing the function.

Activities in which a user is programming or interfacing with the portable computer 100 require the portable computer to be in a high power state. For such activities, the duration of the time-out period is set to be sufficiently long so as to allow a user to complete an activity without having to needlessly interact with the portable computer. We have discovered that for some applications, however, user activity is unlikely after the portable computer is switched into a high power state. Previous portable and handheld computer devices unnecessarily remain in an on-state for the duration of the default time-out period when performing such activities, unless directed by the user to switch into a low power state. Requiring user intervention to switch the portable computer into the low power state is burdensome and unreliable, such as when the user is not near the portable computer 100 when an alarm has sounded. If these applications are repetitive, such as in the case of alarms that repeatedly notify users of calendar events, the portable computer wastes considerable power in maintaining the portable computer on for the default time-out period each time the alarm is activated. An advantage provided by embodiments of this invention is that the duration of time in which the portable computer remains in a high power state is shortened for applications in which subsequent user activity is unlikely.

The algorithm detailed below implements a second time-out period to switch the portable computer from a high power state to a low power state for selective applications, termed herein as "events". An event causes the portable computer 100 to perform a programmed function, or execute a sequence of code, while in a high power state, such as an on-mode or doze-mode. Events differ from other activities performed by the portable computer that require it to be in the on-state because, on the average, user activity does not follow an event.

With further reference to FIG. 3, step 310 provides that that the state of the portable computer 100 is stored in a register of the memory 215. As mentioned, the state of the portable computer 100 may be referenced with respect to the state in which the portable computer 100 consumes the least amount of power. The power states of the portable computer are intended to be used herein as relative terms. Therefore, in an embodiment of this invention, a low power state may encompass an off-mode or a doze-mode, and a high power state ma y encompass a doze-mode or an on-mode.

In certain applications, the high power state may even reference a mode in which the portable computer 100 is not operational to the user, but that the portable computer is consuming power in greater amounts than in the low power state. This kind of mode may correspond to a battery recharge mode, in which the portable computer 100 consumes power to recharge batteries, and/or to perform functions with the processor such as control the power flow to the battery, and signal to the display 114 that a battery recharge is taking place, etc (see discussion regarding FIGS. 1 and 2).

The state of the portable computer may be stored in a two-bit portion of a memory register. The memory register is located on the memory 215, although it may also be positioned on the processor 210 or elsewhere in the portable computer 100. If applicable, the portable computer 100 may store three or more states, although this disclosure will focus on describing an embodiment of the invention with respect to two states.

An event, such as an alarm or wireless page, is identified by the portable computer 100. As shown by step 320, the portable computer 100 is preferably signaled so that the processor 210 must perform a programmed function or execute a sequence of codes while in the high power state. The signal may be provided from an input source such as the display 114, function keys 115, communications portal 132, IR port (not shown) or wireless communication receiver (not shown). The signal may also be generated by the processor 210 and/or and memory 215, as in the case of an alarm produced by a clock circuit.

In step 325, the portable computer 100 determines whether the signal represents initiation of an event, or some other function that requires the portable computer to operate in a high power state. The portable computer 100 may distinguish an event from other activities through programming that designates certain activities as events. The portable computer 100 may be preprogrammed to recognize as events, for example, preprogrammed alarms that signal outputs corresponding to dates and appointments in memory. Other examples of events that may be preprogrammed into the portable computer 100 include sending and/or receiving wireless communications such as pages, or a battery recharge. Still further, the portable computer 100 may list an event to include actively coupling the portable computer to an accessory such as a communication cradle, mode, or USB cradle. An event may also correspond to the portable computer 100 determining whether an accessory device (such as a communication cradle modem port, etc.) is actively coupled, or for determining a type of the accessory device being coupled. In comparison, other activities such as operating input keys or digital keys may, in many applications, be programmed to not be considered as events for the purpose of step 325, even though they will also cause the portable computer to perform programmed functions or execute code.

Therefore, events may be predefined sets of commands or functions which require the portable computer to switch from a low power state to a high power state. The portable computer is preferably programmed to distinguish events from other activities. For example, a look-up table may be provided which lists a series of signals received, generated or sent by the portable computer 100. Then, the occurrence of the series of signals which are stored in the look-up table is interpreted as an event by the processor 210.

Upon signaling of the event, the algorithm in step 330 recalls the state of the portable computer 100 prior to the event being signaled. The information may be accessed by the processor 210 from the memory 215. If the portable computer 100 was in the high power states at the time the event occurred, the portable computer 100 maintains the default time-out period in step 335. If the portable computer 100 was in the low power state, a second time-out period is set in step 340 to replace the default time period. The portable computer 100 times-out to the low power state if no additional inputs or signals are received during the second time-out period. In one embodiment, the second time-out period lasts only for the duration of the event so that the portable computer 100 enters the low power state immediately after the event is over. Alternatively, the second time-out period is longer than the event so that the portable computer 100 stays in a high power state for a duration after the event is completed. During the second time-out period, an input or activity from the user may trigger the portable computer 100 to remain in the high power state and to use the original default time period.

In an embodiment, the duration of the second time-out period is preprogrammed and constant. In other embodiments, more than two preprogrammed time-out periods may be employed in addition to the default time-out period. Still further, other embodiments may determine a second or additional time-out periods dynamically through learned behavior.

Step 350 shows that the portable computer 100 performs event functions during the second time-out period. For example, the processor 210 may display an occurrence of the event on the display 114, or initiate an audible signal for a short period of time. The processor 210 may also write the occurrence of the event to the memory 215, so that the event is stored in memory or displayed the next time the portable computer is entered into an on-state.

In step 360, the portable computer 100 times out after the second time-out period is over. The portable computer 100 then returns to the low power state, which as previously mentioned, may be a sleep-mode or another off state.

Portable computers generally employ alarms to notify users of calendar events, such as appointments. In an embodiment, alarms are programmed to be tracked with a clock and a memory when the portable computer 100 is in either a low power state (off/sleep-mode) or in a high power state (on/doze-mode). When the portable computer 100 is in a low power state and the alarm is triggered, the portable computer generally switches states and performs alarm functions in a high power state. In previous systems, the alarm functions include displaying the alarm, or sounding an audible. Until now, the portable computer always stays on for the duration of the default time period, unless the user switches the portable computer back to the low power state. As noted above, we have discovered that if an alarm occurs while the portable computer is in the off state, user activity is generally not followed as a result of the alarm occurring. Therefore, the alarm is an example of an event under an embodiment of this invention. A second time-out period may be implemented in which the portable computer may be timed out after performing an alarm function, where the second time-out period is shorter than the default time period.

FIG. 4 illustrates a specific example of an embodiment of this invention for implementing a second time-out period in which the portable computer 100 switches to a low power state after an alarm has been signaled to the portable computer 100. In step 410, the portable computer stores its state in a memory register, which may be located on the memory 215. This may be a continuous operation that is performed by the processor 210 when the portable computer 100 is in either the low power or high power state.

In step 420, an alarm is signaled. The alarm signal may be generated by a clock circuit on the processor 210 which accesses data within the memory 215 to signal an alarm at a predetermined time. Preferably, at the onset of the alarm being signaled, the processor 210 in step 425 checks the memory register to recall the state of the portable computer 100 prior to the alarm being signaled. If the portable computer 100 was in the high power state at that time, the portable computer maintains normal operations and keeps the original default time, as shown by step 435. If the portable computer was in the low power state at that time the alarm signaled, the portable computer in step 440 starts the second time-out period, preferably from the time the alarm is signaled. The second time-out period may be preprogrammed or determined as described with the embodiment of FIG. 3.

In step 450, the portable computer 100 performs functions during the second time-out period associated with the alarm function. The portable computer can signal in audible during the second time-out period, or display a dialog box on the display 114 indicating that the alarm has gone off. In an embodiment, the portable computer 100 may also write to memory the occurrence of the alarm during the second time-out period. Then, the next time the portable computer is switched to the high power state by the user, a dialogue box may pop-up to notify the user of the alarm having been previously actuated. One or all of these functions may be performed by embodiments of this invention after the alarm is signaled. The second time-out period should be predetermined to be set according to the functions executed by the portable computer in performing the alarm. For example, if the alarm is performed as an audible, the second time-out period may last for several seconds to sound the alarm. If the alarm consists of writing to memory the occurrence of the alarm, the second time-out period may be less than a second. In either case, the portable computer may switch back to the low power state in step 460 in a much shorter time than previously provided by the default time period, thereby saving power and preventing user error.

In addition to saving battery resources, advantages include avoiding accidental entries into the portable computer resulting from the portable computer being in high power state that is susceptible to inadvertent entries. For example, the function keys 115 shown in FIG. 1 may be actuated inadvertently for the duration of the default time-out period following the alarm. As a result, the portable computer 100 may receive entries to adjust the portable computer setting, or incorrect information as a result of the portable computer being on without the user's knowledge. This embodiment reduces or removes the possibility that inadvertent entries will affect the portable computer 100 once the computer has turned on to perform an alarm.

Alternative Embodiments

Several variations and additional features may be incorporated in embodiments of this invention.

In an alternative embodiment, learned behavior may provide, for example, that the processor 210 determine one or more additional time-out periods through stochastic monitoring of user activity, such as by making repeated measurements and determinations of the duration of user activity after an alarm has sounded or a wireless page has been received. In this embodiment, if the user has a tendency to interact with the portable computer shortly after the alarm has sounded, an additional time-out period employed for the alarm may extend for a suitable duration after the alarm has sounded. If the user has a tendency to neglect an alarm in general, or to neglect the alarm when the alarm sounds off at a particular time of day, then the additional time-out period may be set to regularly or selectively switch the portable computer into a low power state immediately after the alarm has completed sounding off.

While this embodiment has been described with reference to a single low power state, alternative variations may employ two or more low power states. In these embodiments, the portable computer 100 begins in a first low power state such as a sleep-mode. The portable computer 100 then performs the event in a high power state. After the second time-out period is over, the portable computer 100 times out into a second low power state, such as a doze, in which the portable computer 100 consumes less energy than the high power state.

CONCLUSION

The foregoing description of various embodiments of the invention have been presented for purposes of illustration and description. It is not intended to limit the invention to the precise forms disclosed. Many modifications and equivalent arrangements will be apparent.

What is claimed is:

1. A method for operating a handheld computer, the handheld computer being operable in a first power state of reduced power consumption and a second power state of power consumption greater than the first power state, wherein the handheld computer is operable in the first power state and the second power state to process a user-input for executing an application, and wherein the handheld computer is configured to switch from the second power state to the first power state when the handheld computer is in the second power state for a default time period after receiving a user-input without receiving another user input during the default time period, the method comprising:

identifying an event that requires the handheld computer to be in the second power state to perform a program sequence;

performing the program sequence with the handheld computer in the second power state;

in response to identifying the event, determining whether the handheld computer was in the first power state prior to the event being identified; and causing the handheld computer to enter the first power state during a second time period, wherein the second time period is less than the default time period, in response to determining that the handheld computer was in the first power state prior to identifying the event.

2. The method of claim 1, wherein causing the handheld computer device to enter the first power state during a second time period includes replacing the default time period with the second time period until a subsequent entry is entered or another event is identified by the handheld computer.

3. The method of claim 1, wherein causing the handheld computer to enter the first power state during a second time period switching the handheld computer to the first power state after an alarm is performed as part of the program sequence.

4. The method of claim 1, wherein identifying an event includes generating the alarm to signal a calendar event, and performing the program sequence includes signaling the alarm for an entire duration of the second time period.

5. The method of claim 1, wherein identifying an event includes generating the alarm to signal a calendar event, and performing the program sequence includes signaling the alarm before switching the handheld computer to the first power state at a period after the alarm signal has finished.

6. The method of claim 1, wherein identifying an event includes generating the alarm to signal a calendar event, and performing the program sequence includes audibly signaling the alarm before switching the handheld computer to the first power state.

7. The method of claim 6, wherein identifying an event includes generating the alarm to signal a calendar event, and performing the program sequence includes displaying a dialogue box after the second time period upon the handheld computer being signaled another event, or upon the handheld computer receiving another entry.

8. The method of claim 1, wherein the first power state corresponds to an operable state of lowest power consumption by the handheld computer, and the second power state corresponds to an operable state of power consumption sufficient to display an output.

9. The method of claim 1, wherein the first power state corresponds to a sleep-mode and the second power state corresponds to either an on-mode.

10. The method of claim 1, wherein identifying an event includes receiving a signal to recharge an internal power supply.

11. The method of claim 1, wherein identifying an event includes receiving or sending a wireless communication.

12. The method of claim 1, wherein identifying an event includes receiving a signal to switch the handheld computer into the second power state, the signal being received from an input source.

13. The method of claim 12, wherein the input source is a switch integrated into a rail for retaining a stylus used to operate the handheld computer, wherein removing the stylus from the rail actuates the switch so that the handheld computer enters the second power state.

14. The method of claim 1, wherein identifying an event includes receiving a voltage signal for detecting an accessory device.

15. The method of claim 1, wherein identifying an event includes receiving a voltage signal for detecting an accessory type of an accessory coupled to the handheld computer.

16. A method for operating a handheld computer, the handheld computer being operable in at least two power states including a first power state of reduced power consumption and a second power state of power consumption greater than the first power state, wherein the handheld computer is operable in the first power state and the second power state to receive a user-input for executing an application, and wherein the handheld computer is configured to switch from the second power state to the first power state when the handheld computer is in the second power state for a default time period after receiving a user-input without receiving another user-input during the default time period, the method comprising:

generating a signal to actuate an alarm on the handheld computer;

determining whether the handheld computer was in the first power state prior to generating the signal to actuate the alarm; and in response to determining that the handheld computer was in the first power state prior to generating the signal to actuate the alarm, causing the handheld computer to switch to the first power state during a second time period, wherein the second time period is less than the default time period.

17. The method of claim 16, wherein causing the handheld computer to enter the first power state during a second time period includes setting the second time period to replace the default time period after generating the signal to actuate the alarm.

18. The method of claim 16, wherein generating a signal to actuate an alarm includes performing an audible or visual output during the second time period.

19. The method of claim 16, wherein generating a signal to actuate an alarm includes displaying a dialogue box on a display of the handheld computer during the second time period, the content signaling an alarm output.

20. The method of claim 16, wherein generating a signal to actuate an alarm includes writing to a memory an alarm output during the second time period, and then displaying from the memory the alarm output after the second time period.

21. The method of claim 20, wherein causing the handheld computer to enter the first power state during a second time period includes displaying from the memory the alarm output once the handheld computer enters the second power state from the first power state.

22. The method of claim 16, wherein the first power state corresponds to an operable state of lowest power consumption by the handheld computer, and the second power state corresponds to an operable state of power consumption sufficient to display an output.

23. A handheld computer comprising:

a processor associated with the memory and operable in at least two power states including a first power state of reduced power consumption and a second power state of power consumption greater than the first power state, the processor being able to process a user input for executing an application in either the first power state or the second power state, the processor being configured to switch the handheld computer from the second power state to the first power state when the handheld computer is in the second power state for a default time period after receiving a user-input without receiving another user-input during the default time period;

a memory for storing one of the first or second power states prior to the processor identifying an event that requires the processor to be in the second power state to perform a programmed function; and wherein the processor is configured so that upon the processor identifying the event, if the state of the processor prior to receiving the event is the first power state, the processor operates in the second power state during a second time period, the second time period being less than the default time period.

24. The handheld computer of claim 23, wherein the processor is configured so that upon the processor identifying the event, if the state of the processor prior to receiving the event is the first power state, the processor operates in the second power state during a second time period by executing a sequence for replacing the default time period with the second time period until a subsequent entry is entered or another event is identified by the processor.

25. The handheld computer of claim 23, wherein the processor operates in the second power state during a second time period by executing a sequence for performing the programmed function during the second time period and then switching the handheld computer from the second power state to the first power state after the sequence is executed.

26. The handheld computer of claim 25, wherein the event includes an alarm that indicates a calendar event, and the processor executes the sequence to perform the alarm for the duration of the second time period.

27. The handheld computer of claim 25, wherein the event includes an alarm that indicates a calendar event, and the processor executes the sequence to signal the alarm before switching the handheld computer to the first power state at a period after the alarm signal has finished.

28. The handheld computer of claim 25, wherein the event includes an alarm that indicates a calendar event, and the processor executes the sequence to audibly signal the alarm before switching the handheld computer to the first power state.

29. The handheld computer of claim 28, wherein the event includes an alarm that indicates a calendar event, and the processor executes the sequence to display a dialogue box after the second time period and upon the handheld computer being signaled another event, or upon the handheld computer receiving another entry.

30. The handheld computer of claim 23, wherein the processor executes a program that displays a dialogue box on a display of the handheld computer during the second time period in which the event is identified.

31. The handheld computer of claim 23, wherein the first power state corresponds to an operable state of lowest power consumption by the handheld computer, and the second power state corresponds to an operable state of power consumption sufficient to display an output.

32. The handheld computer of claim 23, wherein the first power state is a sleep-mode and the second power state is an on-mode.

33. The handheld computer of claim 23, wherein the event includes receiving or sending wireless communications.

34. The handheld computer of claim 23, the event includes recharging an internal power supply.

35. The handheld computer of claim 23, wherein the event includes switching the processor into the second power state using an input source.

36. The handheld computer of claim 23, wherein the event includes receiving a signal for detecting whether an accessory device is actively coupled to the handheld computer.

37. The handheld computer of claim 23, wherein the event includes receiving a signal for detecting an accessory type of an accessory coupled to the handheld computer.

38. A handheld computer, the handheld computer being operable in at least two power states including a first power state of reduced power consumption and a second power state of power consumption greater than the first power state, wherein the handheld computer is operable in the first power state and the second power state to receive user-input for executing an application, and wherein the handheld computer is configured to switch from the second power state to the first power state when the handheld computer is in the second power state for a default time period after receiving a user-input without receiving a user-input during the default time period, the handheld computer comprising:
  a processor configured to generate a clock signal that requires the handheld computer to be in the second power state to perform an alarm function;
  a memory for storing one of the first or second power states prior to the processor generating a clock signal that requires the handheld computer to be in the second power state to perform an alarm function;
  wherein upon the processor generating the clock signal the processor accesses the memory to determine whether the handheld computer was in the first power state prior to the clock signal being generated; and
  wherein the processor causes the handheld computer to be able to operate in the first power state for a duration lasting only a second time period, the second time period being less than the default time period.

39. The handheld computer of claim 38, wherein the clock signal is generated by a clock generator included in the processor.

40. The handheld computer of claim 38, wherein the clock signal is generated by a clock generator external to the processor.

41. The handheld computer of claim 39, wherein the clock generator associates with the memory to signal the clock signal to the processor at a predetermined moment stored in the memory.

42. The handheld computer of claim 40, wherein the clock generator and processor are included on a single chip.

43. The handheld computer of claim 42, wherein the processor alters a portion of the program to replace the default time period with the second time period after generating the signal to perform the alarm.

44. The handheld computer of claim 38, wherein the processor performs the alarm function by providing an audible or visual alarm signal.

45. The handheld computer of claim 38, wherein the processor performs the alarm function by displaying a dialog box on a display of the handheld computer during the second time period, the content signaling an alarm output.

46. The handheld computer of claim 38, wherein the processor performs the alarm function by writing to a memory an alarm output during the second time period, and then displaying from the memory the alarm output after the second time period.

47. The handheld computer of claim 46, wherein the processor performs the alarm function by displaying from the memory the alarm output once the handheld computer enters the second power state from the first power state.

48. The handheld computer of claim 38, wherein the first power state corresponds to an operable state of lowest power consumption by the handheld computer, and the second power state corresponds to an operable state of power consumption sufficient to display an output.

49. The handheld computer of claim 48, wherein the first power state corresponds to a sleep-mode, and the second power state corresponds to an on-mode.

50. The handheld computer of claim 38, wherein in response to causing the handheld computer to be able to operate in the first power state, the processor executes a second program for a prespecified task.

51. The handheld computer of claim 50, wherein the prespecified task corresponds to recharging an internal power source.

52. A handheld computer, the handheld computer being operable in a first power state of reduced power consumption and a second power state of power consumption greater than the first power state, wherein the handheld computer is operable in the first power state and the second power state to receive user-input for executing an application, and wherein the handheld computer is configured to switch from the second power state to the first power state when the handheld computer is in the second power state for receiving a user-input without receiving another user-input during the default time period, the handheld computer comprising:

means for identifying an event that requires the handheld computer to be in the second power state to execute a program sequence;

means for performing the program sequence with the handheld computer in the second power state;

in response to identifying the event, means for determining whether the handheld computer is in the first power state prior to identifying the event; and means for altering a portion of the program if the handheld computer was in the first power state prior to identifying the event, the portion of the program causing the handheld computer to enter the first power state upon a second time period elapsing, wherein the second time period is less than the default time period.

* * * * *